(12) United States Patent
Graham et al.

(10) Patent No.: US 6,888,513 B1
(45) Date of Patent: May 3, 2005

(54) METHOD AND APPARATUS FOR STORAGE AND DEPLOYMENT OF FOLDED PANEL STRUCTURES

(75) Inventors: Jason S. Graham, Santa Barbara, CA (US); David L. McClure, Goleta, CA (US)

(73) Assignee: Raytheon Company, Waltham, MA (US)

( * ) Notice: Subject to any disclaimer, the term of this patent is extended or adjusted under 35 U.S.C. 154(b) by 549 days.

(21) Appl. No.: 10/029,511

(22) Filed: Oct. 18, 2001

(51) Int. Cl.⁷ .............................................. H01Q 15/20
(52) U.S. Cl. ...................................... 343/880; 343/881
(58) Field of Search ................................ 343/880, 881, 343/915, 797

(56) References Cited

U.S. PATENT DOCUMENTS

| | | | | |
|---|---|---|---|---|
| 4,475,111 A | * | 10/1984 | Gittinger et al. | 343/881 |
| 4,989,015 A | * | 1/1991 | Chang | 343/915 |
| 5,992,120 A | * | 11/1999 | Meguro et al. | 52/653.1 |
| 6,028,570 A | * | 2/2000 | Gilger et al. | 343/915 |
| 6,480,157 B1 | * | 11/2002 | Palmer et al. | 343/700 MS |

* cited by examiner

Primary Examiner—James Vannucci
(74) Attorney, Agent, or Firm—William D. Schubert

(57) ABSTRACT

A deployable structure comprising a support and at least one structural element is provided. The structural element is mechanically attached to the support. The latching mechanism assembly is adapted to containing the structural element in a non-deployed state until it is remotely activated or de-latched.

19 Claims, 6 Drawing Sheets

METHOD AND APPARATUS FOR STORAGE AND DEPLOYMENT OF FOLDED PANEL STRUCTURES

RIGHTS OF THE GOVERNMENT

This invention was made with U.S. Government support.

BACKGROUND

1. Field of Use

These teachings relate generally to deployable structures in general and, more particularly, to the storage and remote deployment of folded panel structures.

2. Description of Prior Art

Deployable panels, such as solar arrays with folding solar panels, are known in the art. A typical solar array of this type has a support, such as the body of the spacecraft, that mounts a remote controlled deployment boom that may be extended outwardly from one side of the support. Attached to the deployment boom is a folding solar panel composed of a number of panel sections hinged edge-to-edge along hinge lines extending normal to an extension axis of the boom. The two end panel sections are attached, respectively, to the support and to a cross-member at the outer end of the boom. In the stowed configuration of the solar array, the deployment boom is retracted to locate the cross-member adjacent the support, and the solar panel sections are folded accordion-fashion into confronting face-to-face relation flat against the side of the support. During deployment, the boom is extended outwardly from the support to unfold the solar panel to a deployed configuration wherein the panel sections are disposed edge-to-edge substantially in a common plane containing the boom. It will be appreciated that such deployment booms are complicated electromechanical devices subject to mechanical or electrical malfunction. It will also be recognized that a disadvantage of such booms is their space and weight requirements, a major consideration in the case of spacecraft and/or portable devices. Typically, such deployment booms deploy solar arrays, which include one or more panels supporting solar cells for generating electrical power for a spacecraft, or they deploy radio frequency antenna for the reception or transmission of radio frequency signals. As such, the deployment boom must be adequately protected to ensure proper and continuous functionality throughout a mission. For example, during the launch of a spacecraft, the deployment boom may be subjected to extreme stresses and vibrations. Likewise, a portable device containing such a deployment boom may be subjected to harsh and damaging handling.

Thus, the above suggests a need for the remote deployment of deployable structures without the inherent disadvantages of complicated boom structures.

SUMMARY OF THE PREFERRED EMBODIMENTS

The foregoing and other problems are overcome, and other advantages are realized, in accordance with the presently preferred embodiments of these teachings. As will be described below, important aspects of the invention reside in the construction and combination of structural elements; structural elements such as torsion springs and remote mechanical de-latching mechanisms.

In accordance with one embodiment of the invention a deployable structure having a support and at least one structural element is provided. The structural element is mechanically attached to the support. A latching mechanism assembly is adapted to contain the structural element in a non-deployed state until it is remotely activated or de-latched.

In accordance with another embodiment the invention includes a method for constructing and storing a deployable structure. The method includes the steps of determining a deployed rectangular structure size; forming a perimeter shape of the deployed rectangular structure with a continuous structural element; folding the perimeter shape into at least one uniform section; and storing the uniform sections in a supporting device.

Another embodiment of the invention is directed towards an improved self-erecting turnstile antenna system. The system comprises a supporting device and a plurality of antenna elements connected to the supporting device. A latching mechanism assembly connected to the supporting device maintains the plurality of antenna elements in a non-deployed state. Remote activation of the latching assembly allows the plurality of antenna elements to deploy to an operating position.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
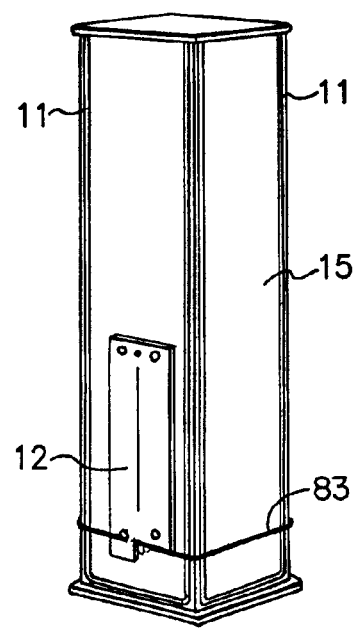
FIG. 1 is an edge on pictorial view showing two deployable structures in collapsed or stowed positions in a rectangular device having a deployable structure on each vertical side of the rectangular device.
Figure 2:
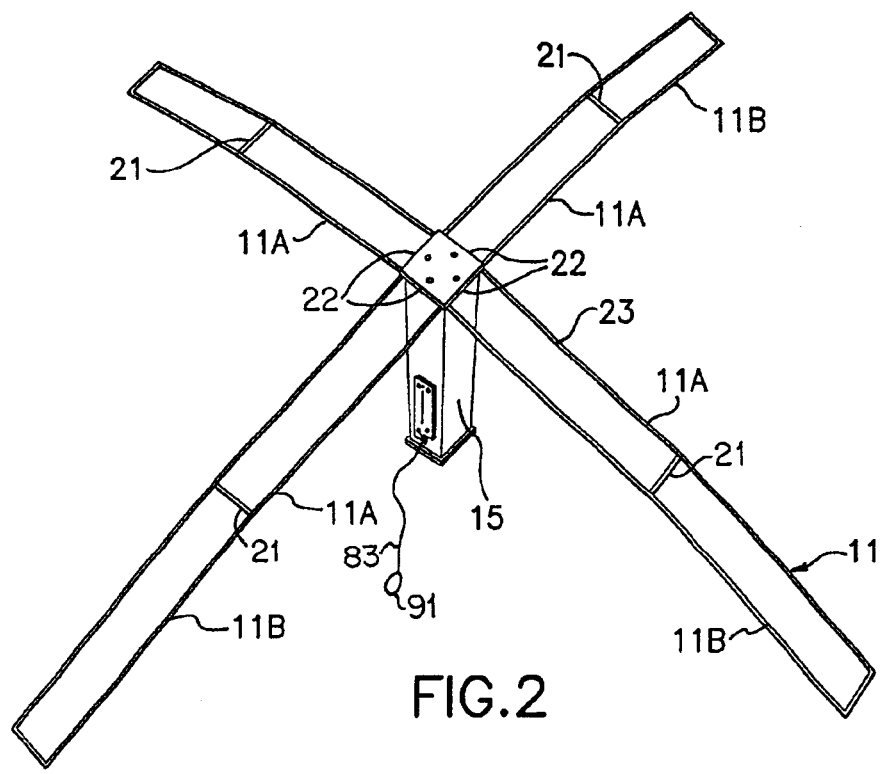
FIG. 2 is an aerial view of the rectangular device shown in FIG. 1 showing the deployable structures in deployed positions.
Figure 12:
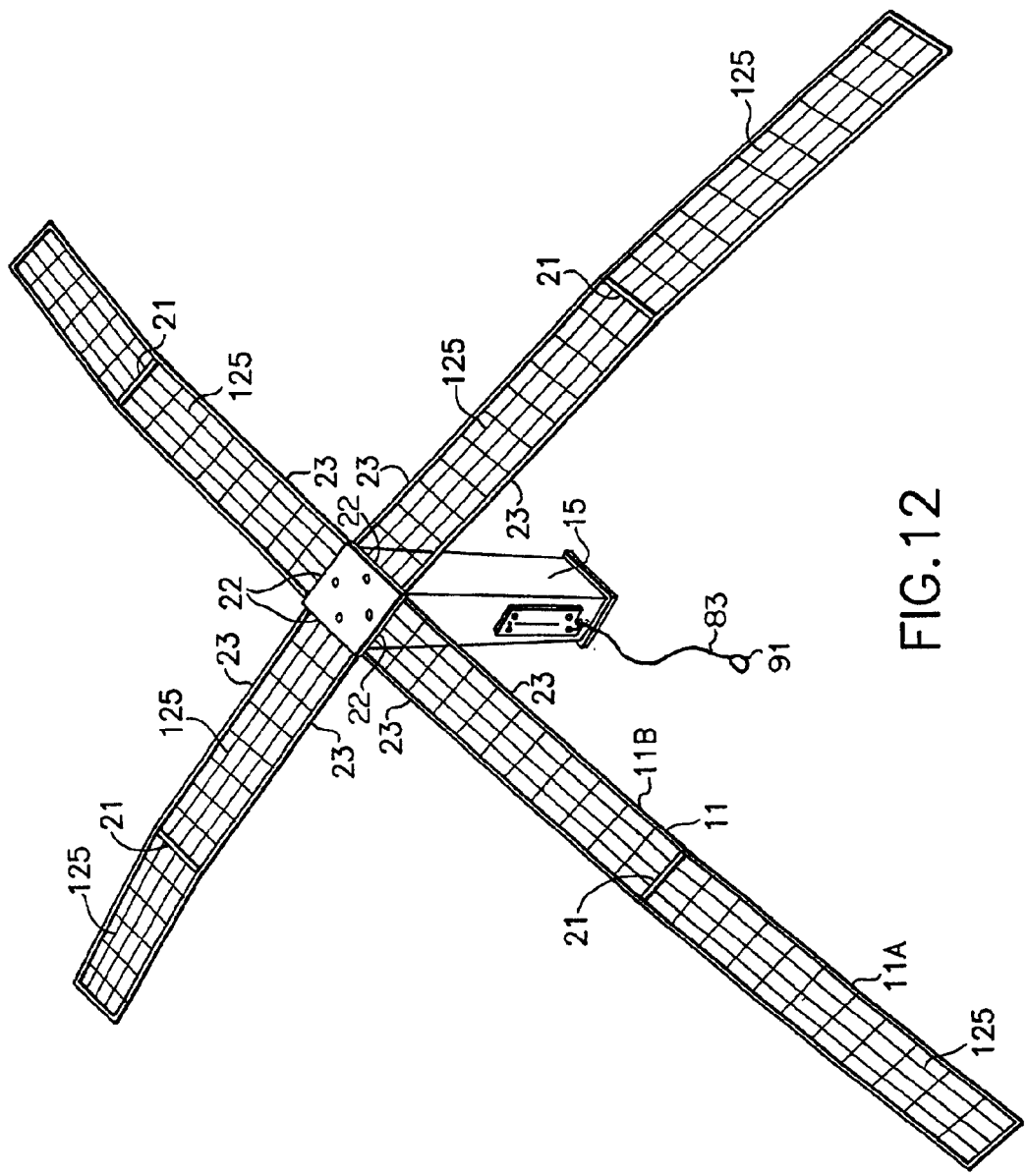
FIG. 12 is an aerial view of an alternate embodiment of the present invention showing the deployed structure with transducer arrays.

Referring to FIG. 1, there is shown a rectangular device 15 incorporating features of the present invention. FIG. 1 presents an edge on pictorial view showing two deployable structures 11 in collapsed or stowed positions in the rectangular device 15; the rectangular device 15 in the preferred embodiment having deployable structures 11 on each vertical side. The device 15 could be any suitable apparatus requiring deployable structures. Exemplary, but not limiting embodiments include: a radio device requiring remote deployment of an antenna structure for the reception and/or transmission of radio frequency signals; a satellite device requiring remote deployment of panels or transducers such as satellite solar panels or radio antennas; or an acoustic processor requiring the remote deployment of acoustic transducer arrays (FIG. 12, item 125). In an alternate embodiment, device 15 could incorporate both embodiments, e.g., elements 11 could serve as the structural panel-supporting elements, as well as the antenna elements. Exemplary, but not limiting embodiments include a sail used to convert the energy of a moving fluid (e.g., atmospheric wind, solar wind, hydrodynamic motion) to an energy form suitable to power supporting device 15. FIG. 1 also shows a latching mechanism assembly 12 and a strapping wire 83 incorporating features of the present invention. Referring also to FIG. 2 the elements 11 are shown in deployed and working positions.

Figure 11:
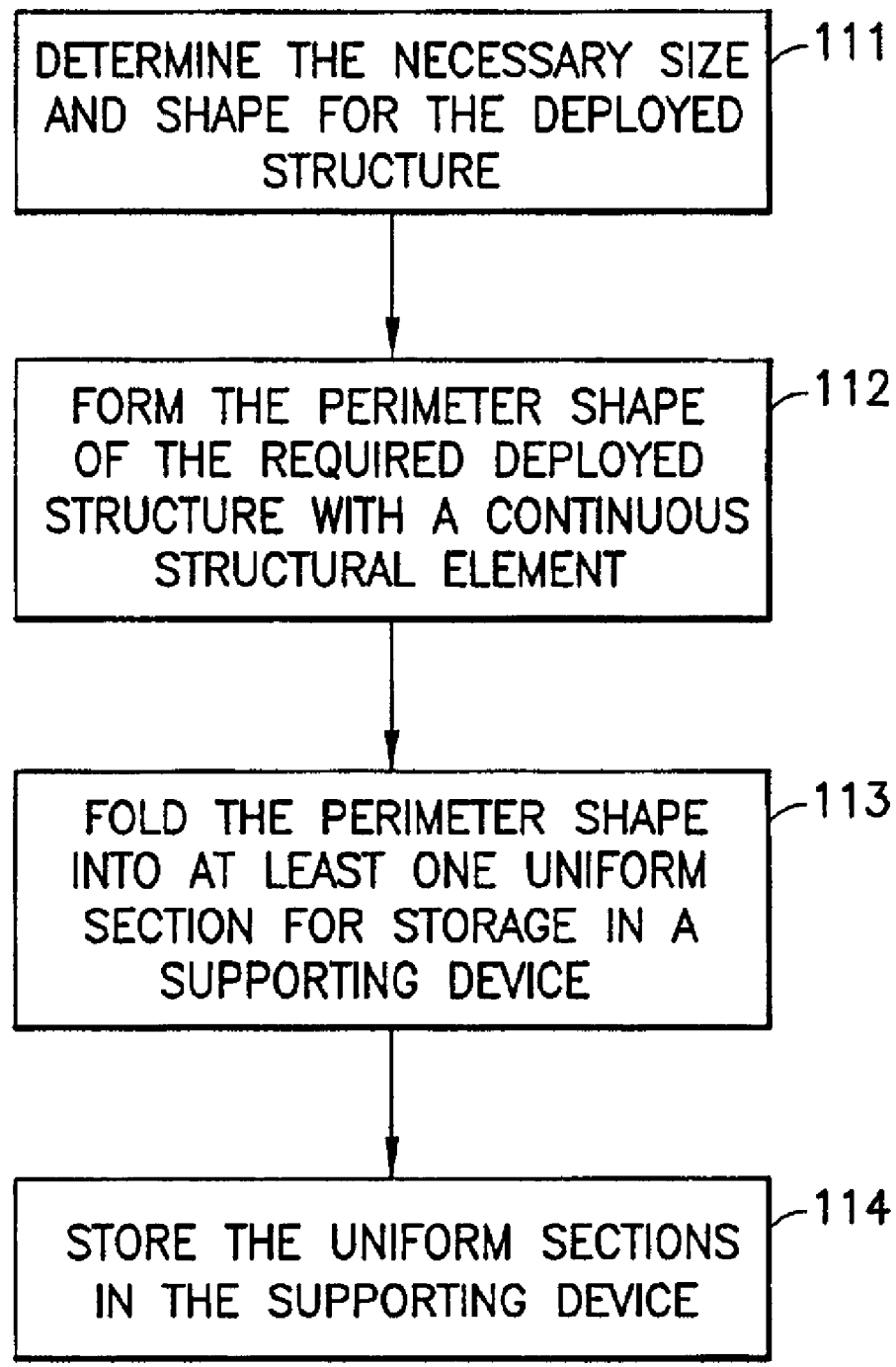
FIG. 11 is a flow chart of one method showing the steps for constructing and storing the deployable structure shown in FIG. 1.

FIG. 11 shows the method steps for forming the rectangular structures shown in FIG. 2. Step 111 determines the size and shape required for the deployed structure 11. Step 112 forms a perimeter shape of the deployed structure 11 with a continuous structural element. In the preferred embodiment the continuous structural element also functions as a horizontally polarized radio frequency antenna element. In alternate embodiments the continuous structural element could function as a vertically polarized RF antenna. Also, in alternate embodiments the continuous structural element could be a single non-conductive element such as plastic wire. Step 113 folds the perimeter shape of the deployed structure 11 in to at least one uniform section 11A, 11B. The folded uniform sections 11A, 11B are then stored in the supporting device 15, step 114.

Figure 3:
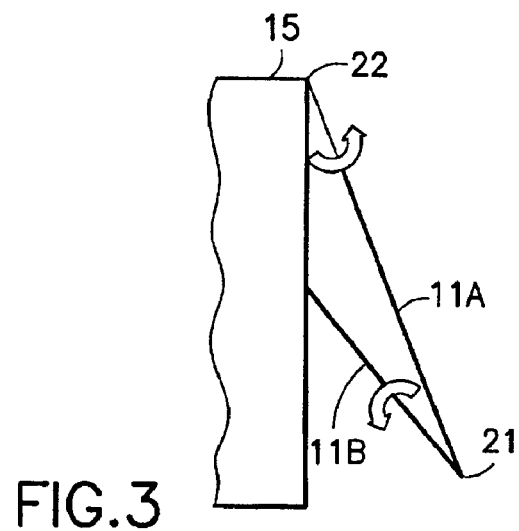
FIG. 3 is a wire diagram showing one 90-degree and one 180-degree joint articulation of one of the deployed structure elements shown in FIG. 1 and FIG. 2.

Referring also to FIG. 3 there is shown a wire diagram showing one 90-degree and one 180-degree joint articulation between the uniform sections of one of the deployed structure elements 11 shown in FIG. 1 and FIG. 2. The structural elements 11 are articulated to satisfy both packaging volume and working horizontal positions. FIG. 3 further illustrates the articulation of an element between the collapsed and deployed state and the relative angles between the device 15 and subsequent sections of the structural element 11A, 11B. In the preferred embodiment the structural elements 11 include a single wire-like element capable of electromagnetic transmission; the single wire is shaped into uniform sections 11A, 11B, for efficient storage of the collapsed structural element 11 as shown in FIG. 1. In addition the uniform section widths are generally shaped to facilitate radio frequency transmission and reception. In general, the width of a section (e.g., 11A, 11B) is one-quarter wavelength of the intended wavelength to be received or transmitted. In an alternate embodiment the single wire may be formed into as many sections as needed to efficiently fit within a predefined space.

Figure 4:
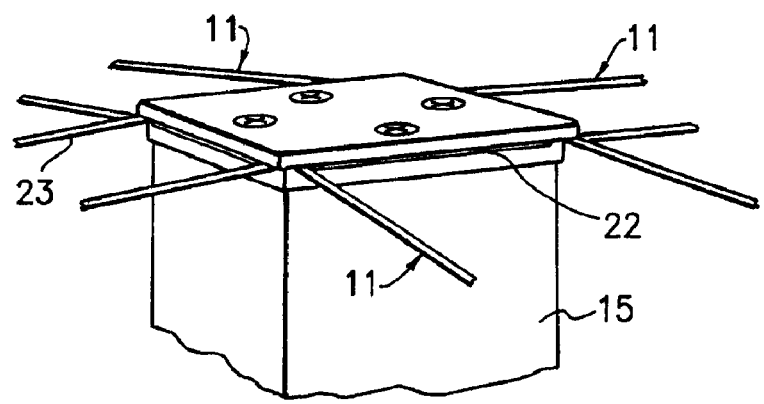
FIG. 4 is a pictorial view of one of the 90-degree joints shown in FIG. 2 and FIG. 3 showing reinforcement of the 90-degree joints.

Referring also to FIG. 4, there is shown in the preferred embodiment the joint between the first section 11A and the device 15. The wire or structural element 11 is formed into a configuration of two straight wire torsion springs (FIG. 5, items 22).

Figure 5:
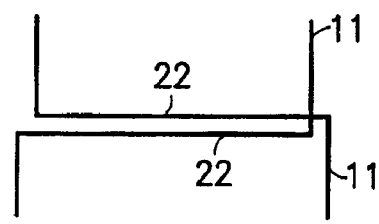
FIG. 5 is a wire diagram of one of the 90-degree joints shown in FIG. 3, showing the joint in a 90-degree torsion spring configuration.

Referring also to FIG. 5, there is shown a wire diagram showing the formation of structural element 11 to form a torsion spring 22 along the width of the section to accomplish 90 degrees of movement. In an alternate embodiment each of the straight wire torsion springs could incorporate a helical wound spring.

Figure 6:
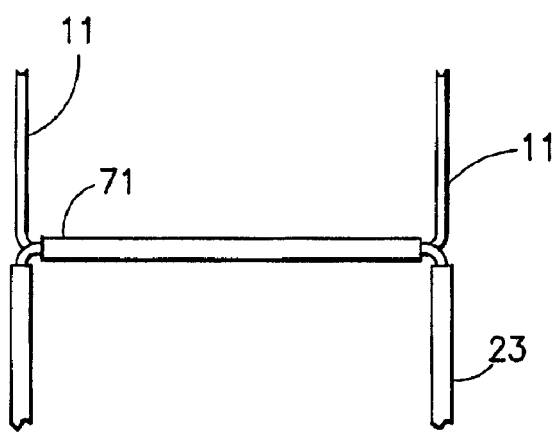
FIG. 6 is a pictorial view of one of the 180-degree joints shown in FIG. 2 and FIG. 3 showing reinforcement of the 180-degree joint.
Figure 7:
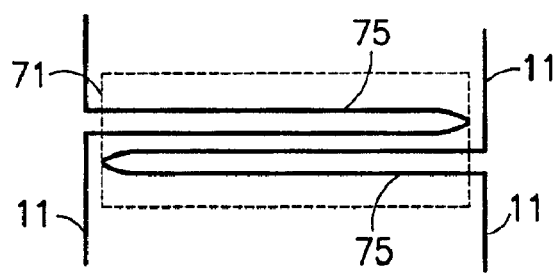
FIG. 7 is a wire diagram of one of the 180-degree joints shown in FIG. 3, showing the joint in a 180-degree torsion spring configuration.

Referring still to FIG. 3 it is clear that the middle joint 21 and any subsequent joints of the structural element 11 are capable of articulating 0 to 180 degrees. The effective length of a torsion-like spring should be twice the width of the section 11A to perform properly and without experiencing permanent deformation of the structural element 11. Yet, the structural element 11 must still fit efficiently into the space provided by device 15. Thus, forming the structural element 11 as shown in FIG. 6 and FIG. 7 allows the formation of two 180-degree articulating joints 75. FIG. 7 shows in greater detail the configuration of the structural element wire 11 when forming the 180-degree joint articulations. Effectively, the structural element wire 11 is used as a 90 degree torsion spring for one width of the section, and then doubled back along that same width for the other 90 degrees of movement. Thus, the spring joints 75 bend their fully intended range of 180-degrees without any permanent deformation. In an alternate embodiment each of the straight wire torsion springs 75 could incorporate a helical wound spring.

Each element of the structural element 11 is constructed from one continuous piece of wire and joined at the 180-degree bend points of each section with a heat-shrinking polymer tube 71. In alternate embodiments this could be any suitable tube material for housing and not interfering with the bending of the structural element 11.

In the preferred embodiment the structural element 11 is small diameter drawn wire suited to the transmission and reception of radio frequency signals. Due to the length of the wire in the preferred embodiment, and the low bending stiffness of the small diameter wire, reinforcement tubes 23 are placed on the inboard segments of each section. In the preferred embodiment the reinforcement tubes are $\frac{1}{16}$-inch outer diameter metal tubes that house the drawn wire, and increase its bending stiffness. These reinforcing tubes 23 are shown in FIGS. 2, 4, and 6. In an alternate embodiment the reinforcing tubes 23 could be any suitable structural elements for reinforcing small diameter wire.

Figure 8:
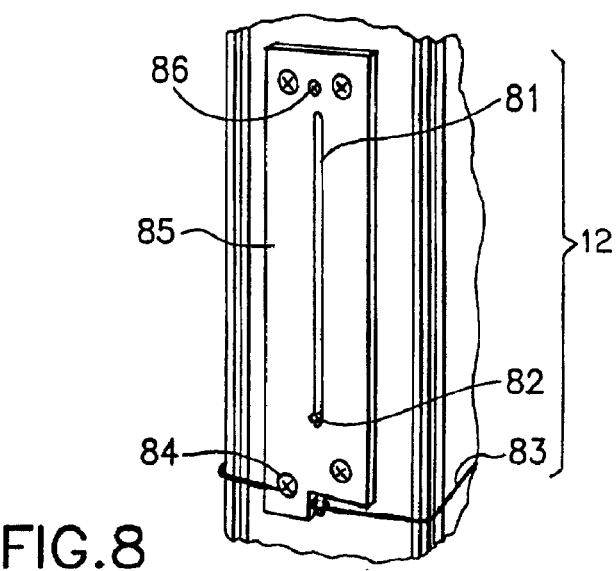
FIG. 8 is pictorial view of a latching mechanism in the latched position and holding the deployable structures of FIG. 1 in the collapsed or stowed position.

Referring also to FIG. 8 there is shown a pictorial view of the latching mechanism 12 in the latched position and holding the deployable structures of FIG. 1 in the collapsed or stowed position. Deployment of the structural element 11 is initiated by application of an electrical pulse to the positive connection 86 that then releases the strapping wire 83 and allows the stored energy contained in the torsion joints 21,22 to deploy the stored structural elements 11.

Figure 9:
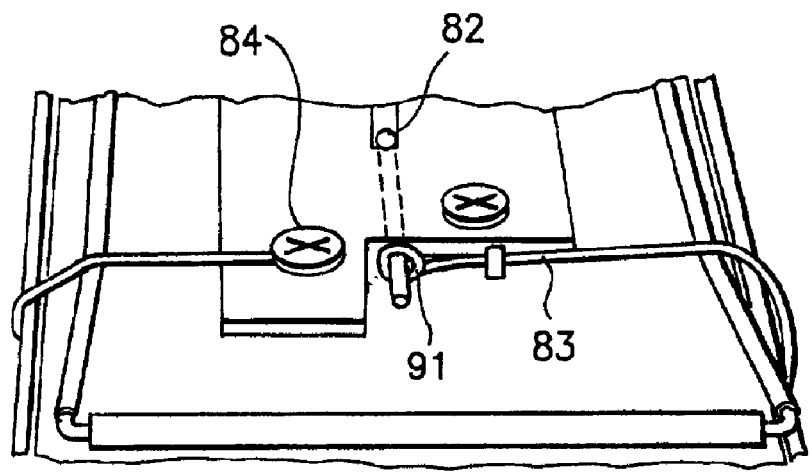
FIG. 9 is a pictorial view of the latching mechanism shown in FIG. 8, showing a latching pin and strap.

Referring also to FIG. 9 there is shown a pictorial view of the invention incorporating features of the latching mechanism. Strap wire 83 is wrapped around the stored structural elements 11, with a loop 91 on one end of the strapping wire 83. The loop 91 slides over strap pin 82 and the other end of the strapping wire 83 is attached to an electronics chassis grounding screw 84. The stored structural elements 11 exert an outward force due to the tension contained in the 90-degree and 180-degree joints. Thus, when the strapping pin 82 is pulled out of the loop 91, the strap releases, and allows the spring-loaded structural elements 11 to deploy. The strapping wire 83 is generally constructed of small gauge wire and the strap pin 82 from small tubing. In an alternate embodiment any suitable strapping wire and pin arrangement may be used.

In the preferred embodiment the strap pin 82 is actuated or pulled out of the loop by using small gauge nickeltitanium contracting wire 81 which contracts when electrically driven. The wire 81 is anchored by the positive connection 86 and insulated from the chassis at this anchor point. The other end of the contracting wire 81 is attached to the strap pin 82, which is grounded through the strap wire 83 at the ground screw 84. In the preferred embodiment the contracting wire may be any suitable thermally actuated shape memory alloy device.

A voltage potential is applied to the positive connection 86 and a current flows through the contracting wire 81. This causes the wire 81 to physically shorten in length, thus pulling the strap pin 82 from the loop 91 of the strapping wire 83. FIGS. 8 and 9 illustrate the flow of electrical current as dashed lines. In the preferred embodiment the application of a signal to the positive connection Is via a remote control signal to a relay-like device (not shown), which in turn applies a voltage potential to the positive connection. Remote controlled relays are well known and will not be discussed further. In an alternate embodiment the application of a voltage potential could be any suitable method for applying a voltage potential to the positive connection 86. For example a timer controlled relay circuit could be employed. In addition, it should be noted that it does not mater which direction current flows through the contracting wire 81. In an alternate embodiment a negative voltage potential could be applied to the positive connection 86. Current flow would then be opposite to that shown as dashed lines in FIGS. 8 and 9.

Referring still to FIG. 9, it is dear that the strapping wire 83 completes the electrical circuit; current flows from the positive connection 86, through the contracting wire 81, through the strap pin 82 to the strapping wire 83 and finally to chassis ground 84. Once the strapping wire 83 has been released, the electrical path is disrupted and the circuit is open circuited.

Figure 10:
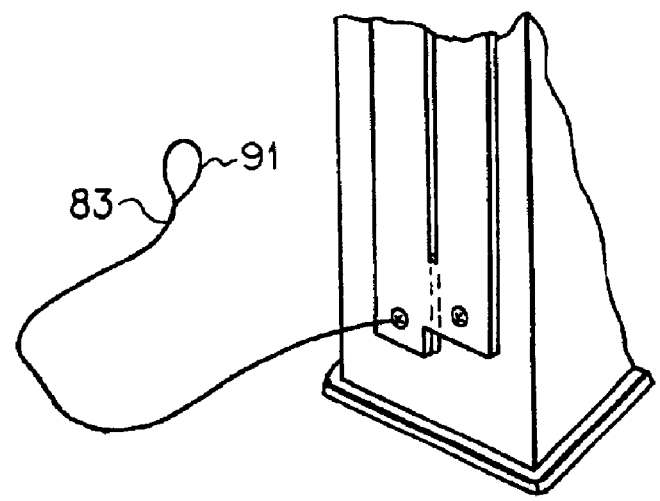
FIG. 10 is a pictorial view of the latching mechanism shown in FIG. 8, showing the latching mechanism in the de-latched and open circuit position.

In the preferred embodiment, the housing and fixture 85 for the actuating wire-pin assembly is made from nonconductive material. This allows the ground to only be completed by the strap that retains the antennas. FIG. 10, exhibits the latch and strap in the open-circuit position after the elements have been erected. Notice the strapping wire 83 and chassis ground is no longer in electrical contact with the strap pin 82.

It should be understood that the foregoing description is only illustrative of the invention. Moreover, it will be readily appreciated that an advantage of the present invention is the use of the antenna elements that are self-articulating through torsion type joints. It will be further appreciated that advantages of the present invention include remote deployment of structural elements without cumbersome and complicated boom devices and that the latching mechanism feature utilizes a unique contracting wire circuit for actuation and automatically deactivates itself after deployment of the elements. Thus, various alternatives and modifications can be devised by those skilled in the art without departing from the invention. For example, the torsion springs could include helical forms in addition to, or in place of the wire form shown, in order to accommodate various articulations. Accordingly, the present invention is intended to embrace all such alternatives, modifications and variances that fall within the scope of the appended claims.

What is claimed is:

1. A deployable structure comprising;
   a support;
   at least one structural element, the at least one structural element mechanically attached to the support, wherein the at least one structural element comprises:
   a continuous wire, wherein the continuous wire is adapted to form a plurality of foldable sections; and wherein the continuous wire is adapted to form at least one torsion spring between the plurality of foldable sections; and
   at least one latching mechanism assembly, the at least one latching mechanism assembly adapted for containing the at least one structural element in a non-deployed state.

2. A deployable structure as in claim 1 wherein the at least one structural element comprises a radio antenna adapted to transmit, receive, or transceive radio frequency signals.

3. A deployable structure as in claim 1 wherein the radio antenna comprises a horizontally polarized antenna.

4. A deployable structure as in claim 1 wherein the radio antenna comprises a vertically polarized antenna.

5. A deployable structure comprising:
   a support;
   at least one structural element, the at least one structural element mechanically attached to the support, wherein the structural element comprises:
   a continuous wire, wherein the continuous wire is adapted to form a plurality of foldable sections; and wherein the continuous wire is adapted to form at least one torsion spring between the plurality of foldable sections; and wherein the at least one foldable section comprises a transducer array; and
   at least one latching mechanism assembly, the at least one latching mechanism assembly adapted for containing the at least one structural element in a non-deployed state.

6. A deployable structure as in claim 5 wherein the transducer array comprises at least one solar energy transducer.

7. A deployable structure as in claim 5 wherein the transducer array comprises at least one acoustic transducer.

8. A deployable structure comprising:
   a support;
   at least one structural element, the at least one structural element mechanically attached to the support, wherein the structural element comprises:
   a continuous wire, wherein the continuous wire is adapted to form a plurality of foldable sections; and wherein the continuous wire is adapted to form at least one torsion spring between the plurality of foldable sections; and
   at least one latching mechanism assembly, the at least one latching mechanism assembly adapted for containing the at least one structural element in a non-deployed state, and wherein the at least one latching mechanism assembly comprises:
   a shape memory device, the shape memory device electrically connectable to a first voltage potential;
   a strap pin, the strap pin electrically conductive and mechanically attached to the shape memory device; and
   a strapping wire, the strapping wire electrically and mechanically connectable to the strap pin and to a second voltage potential.

9. A deployable structure as in claim 8 wherein the shape memory device comprises a thermally actuated shape memory device.

10. A deployable structure as in claim 9 wherein the thermally actuated shape memory device comprises a contracting shape memory device.

11. A self-erecting turnstile antenna comprising:
    a supporting device;

a plurality of antenna elements connected to the supporting device,
wherein the plurality of antenna elements each comprise:
a continuous wire, having:
a first uniform rectangular section, wherein the first uniform rectangular section is mechanically attached to the support device by two 90-degree torsion springs; and
a second uniform rectangular section, wherein the second uniform rectangular section is mechanically coupled to the first uniform rectangular section by two 180-degree torsion springs and
at least one latching mechanism assembly, the at least one latching mechanism assembly connected to the supporting device.

12. A self-erecting turnstile antenna as in claim 11 wherein the two 90 degree torsion springs are comprised of the continuous wire.

13. A self-erecting turnstile antenna as in claim 11 wherein the two 180 degree torsion springs are comprised of the continuous wire.

14. A self-erecting turnstile antenna as in claim 11 wherein the at least one latching mechanism assembly comprises:
a strapping wire;
a strap pin, the strap pin connectable to the strapping wire; and
a thermally actuated memory device, the thermally actuated memory device electrically connected to the strap pin.

15. A deployable structure for storage and deployment from a support device comprising:
at least one structural element, the at least one structural element mechanically attached to the support, wherein the at least one structural element comprises:
a continuous wire, wherein the continuous wire is adapted to form a plurality of foldable sections; and
wherein the continuous wire is adapted to form at least one torsion spring between the plurality of foldable sections; and
at least one latching mechanism assembly, the at least one latching mechanism assembly adapted for containing the at least one structural element in a non-deployed state.

16. A deployable structure as in claim 15, further comprising an additional torsion spring attaching the at least one structural element to the support.

17. A deployable structure as in claim 15, wherein the at least one torsion spring between said plurality of foldable sections has a range of movement from 0 to 180 degrees.

18. A deployable structure as in claim 16, wherein the additional torsion spring has a range of movement from 0 to 90 degrees.

19. A deployable structure as in claim 15 wherein the at least one structural element comprises a radio antenna adapted to transmit, receive, or transceive radio frequency signals.

* * * * *